(12) United States Patent
Butts et al.

(10) Patent No.: US 7,430,880 B2
(45) Date of Patent: Oct. 7, 2008

(54) PULL ROLL ASSEMBLY FOR DRAWING A GLASS SHEET

(75) Inventors: Dennis I. Butts, Andover, NY (US); Glen B. Cook, Corning, NY (US); John J. Costello, III, Painted Post, NY (US); Hilary T. Godard, Lindley, NY (US); John D. Helfinstine, Big Flats, NY (US); Randy L. Rhoads, Horseheads, NY (US); G. Clinton Shay, Moneta, VA (US)

(73) Assignee: Corning Incorporated, Corning, NY (US)

( * ) Notice: Subject to any disclaimer, the term of this patent is extended or adjusted under 35 U.S.C. 154(b) by 442 days.

(21) Appl. No.: 10/859,272

(22) Filed: Jun. 2, 2004

(65) Prior Publication Data

US 2005/0268655 A1 Dec. 8, 2005

(51) Int. Cl.
C03B 13/16 (2006.01)
C03B 15/02 (2006.01)
C03B 17/06 (2006.01)
C03B 11/08 (2006.01)

(52) U.S. Cl. .................. 65/253; 65/29.12; 65/370.1; 65/158; 65/163; 65/90; 65/53; 65/195

(58) Field of Classification Search ............... 65/29.12, 65/370.1, 158, 163, 90, 53, 195, 253
See application file for complete search history.

(56) References Cited

U.S. PATENT DOCUMENTS 2,270,362 A * 1/1942 Waldron et al. ............ 451/261
2,911,760 A * 11/1959 Barradell-Smith ........... 65/158
3,263,284 A * 8/1966 Orr et al. .................. 164/413
3,332,301 A * 7/1967 Popp et al. ................. 475/6
3,338,696 A 8/1967 Dockerty .................. 65/145
3,462,665 A * 8/1969 Espey et al. ................ 318/85
3,557,865 A * 1/1971 Gallucci et al. .......... 164/150.1
3,682,609 A 8/1972 Dockerty .................. 65/83
3,812,900 A * 5/1974 Bollig et al. .............. 164/454
3,861,456 A * 1/1975 Gallucci et al. ............ 164/413
4,000,449 A * 12/1976 Gripp ....................... 318/72
4,056,140 A * 11/1977 Ives et al. ................. 164/454
4,090,549 A * 5/1978 Ives et al. ................. 164/451

OTHER PUBLICATIONS

"Rugged in-line torque Sensors with Integral Slip Ring Assembly", http://www.omega.com/pptst/TQ501.html Accessed Nov. 2, 2006.*
"Low Range Beam Load Cell", http://www.omega.com/pptst/LCM601.html Accessed Nov. 2, 2006.*

(Continued)

Primary Examiner—Richard Crispino
Assistant Examiner—Jason L. Lazorcik
(74) Attorney, Agent, or Firm—William J. Tucker; Siwen Chen (57) ABSTRACT

A pull roll assembly is described herein that is used to draw a glass sheet. The pull roll assembly includes a first roll assembly, a second roll assembly and a device (e.g., differential drive, sensor(s)). The device enables one to control the first and/or second roll assemblies based in part on pulling forces (e.g., glass contact normal force and/or required sheet pulling force) associated with a glass sheet while the glass sheet is being drawn between the first and second roll assemblies. A glass manufacturing system and method for using the pull roll assembly are also described herein.

5 Claims, 8 Drawing Sheets

OTHER PUBLICATIONS

"LVDT High Accuracy AC Long Stroke Displacement Transducer", Http://www.omega.com/pptst/ld300.html Accessed Nov. 2, 2006.*

"Double Strain Gages, 2 Measuring Grids", http://www.omega.com/pptst/Bending_strain_SG.html Accessed Nov. 2, 2006.*

Kivinen, J-M, Salmenpera, P., "Master slave torque control of roll press unit", the Proceedings of 11th World Congress in Mechanism and Machine Science (IFToMM), Apr. 1-4, 2004, Tianjin, China. vol. 5, pp. 2129-2133.*

* cited by examiner

PULL ROLL ASSEMBLY FOR DRAWING A GLASS SHEET

BACKGROUND OF THE INVENTION

1. Field of the Invention

The present invention relates to a pull roll assembly used in the production of a glass sheet made by the fusion process and, in particular, to techniques for controlling the operation of the pull roll assembly based on pulling forces associated with the glass sheet as it is being drawn by the pull roll assembly.

2. Description of Related Art

Corning Inc. has developed a process known as the fusion process (e.g., downdraw process) to form high quality thin glass sheets that can be used in a variety of devices like flat panel displays. The fusion process is the preferred technique for producing glass sheets used in flat panel displays because the fusion process produces glass sheets whose surfaces have superior flatness and smoothness compared to glass sheets produced by other methods. The fusion process is described in U.S. Pat. Nos. 3,338,696 and 3,682,609, the contents of which are incorporated herein by reference.

The fusion process utilizes a pull roll assembly (e.g., fusion draw machine) that draws the glass sheet between two rolls to stretch the glass sheet to a desired thickness. In particular, the pull roll assembly has two rolls that directly contact the glass sheet and exert a pulling/drawing force on the glass sheet. The final thickness of the glass sheet is inversely related to the pulling force (required sheet pulling force) applied to the glass sheet when the glass sheet is drawn between the two rolls. As such, to stretch the glass sheet to a desired thickness one needs to maintain the required sheet pulling force on the drawn glass sheet.

In the traditional pull roll assembly, the pulling force is indirectly maintained by precisely controlling the speed of rotation with which the rolls act on and rotate against the glass sheet. This indirect means of maintaining the pulling force can lead to a situation where the two rolls damage the surface of the glass sheet. The damage to the surface of the glass sheet is caused when only the rotational speeds of the two rolls are controlled which means that one of the two rolls is going to always slide on the glass sheet because it is impossible to have two rolls with the exact same diameter. The slippage of the rolls not only damages the surface of the glass sheet but can also damage the rolls themselves and break the glass sheets resulting in manufacturing downtime. Accordingly, there is a need for a pull roll assembly that addresses this and other shortcomings associated with the traditional pull roll assembly. This need and other needs are satisfied by the pull roll assembly of the present invention.

BRIEF DESCRIPTION OF THE INVENTION

The present invention includes a pull roll assembly used to draw a glass sheet in a glass manufacturing system. The pull roll assembly includes a first roll assembly, a second roll assembly and a device (e.g., differential drive, sensor(s)). The device enables one to control the first and/or second roll assemblies based in part on pulling forces (e.g., glass contact normal force and/or required sheet pulling force) associated with a glass sheet while the glass sheet is being drawn between the first and second roll assemblies. A glass manufacturing system and method for using the pull roll assembly are also described herein.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Referring to FIGS. 1-8, there are disclosed several embodiments of a pull roll assembly 140 in accordance with the present invention. Although each pull roll assembly 140 is described herein as being used in a glass manufacturing system 100 that uses a fusion process to make a glass sheet 105, it should be understood that each pull roll assembly 140 could be used in any type of glass manufacturing system that draws a glass sheet 105. Accordingly, the pull roll assembly 140 and method 800 of the present invention should not be construed in a limited manner.

Figure 1:
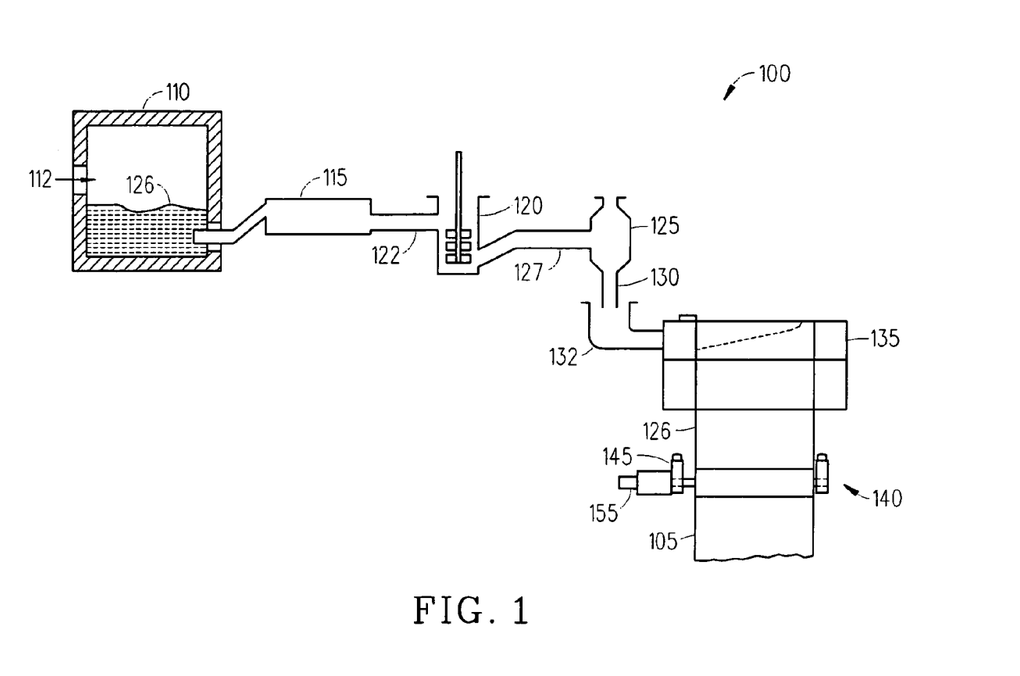
FIG. 1 is a block diagram illustrating an exemplary glass manufacturing system incorporating a pull roll assembly in accordance with the present invention.

Referring to FIG. 1, there is shown a schematic view of an exemplary glass manufacturing system 100 that uses the fusion process to make a glass sheet 105. The glass manufacturing system 100 includes a melting vessel 110, a fining vessel 115, a mixing vessel 120 (e.g., stir chamber 120), a delivery vessel 125 (e.g., bowl 125), a forming vessel 135 (e.g., isopipe 135) and the pull roll assembly 140. The melting vessel 110 is where the glass batch materials are introduced as shown by arrow 112 and melted to form molten glass 126. The fining vessel 115 (e.g., finer tube 115) has a high temperature processing area that receives the molten glass 126 (not shown at this point) from the melting vessel 110 and in which bubbles are removed from the molten glass 126. The fining vessel 115 is connected to the mixing vessel 120 (e.g., stir chamber 120) by a finer to stir chamber connecting tube 122. And, the mixing vessel 120 is connected to the delivery vessel 125 by a stir chamber to bowl connecting tube 127. The delivery vessel 125 delivers the molten glass 126 through a downcomer 130 to an inlet 132 and into the forming vessel 135 (e.g., isopipe 135). The forming vessel 135 which is shown in more detail in FIG. 2 includes an opening 136 that receives the molten glass 126 which flows into a trough 137 and then overflows and runs down two sides 138a and 138b before fusing together at what is known as a root 139. The root 139 is where the two sides 138a and 138b come together and where the two overflow walls of molten glass 126 rejoin (e.g., refuse) before being drawn downward by the pull roll assembly 140 to form the glass sheet 105.

The pull roll assembly 140 includes a first roll assembly 145 (shown in FIG. 1) and a second roll assembly 150 (not shown in FIG. 1). The pull roll assembly 140 also includes a device 155 that controls or enables one to control the first and/or second roll assemblies 145 and 150 while the glass sheet 105 is being drawn between the first and second roll assemblies 145 and 150. In particular, the device 155 which can be a mechanical device (see FIG. 2) or an electrical device (see FIGS. 3-7) is used to control or enable the control of the first and/or second roll assemblies 145 and 150 using the pulling force(s) (e.g., glass contact normal force and/or required sheet pulling force) associated with the glass sheet 105 while the glass sheet 105 is being drawn between the first and second roll assemblies 145 and 150. The required sheet pulling force includes the force supplied to the glass sheet 105 by rolls 145 and 150 and the force associated with the weight of the glass sheet 105. And, since the weight of the glass sheet 105 is constantly changing because of the cutting and removal of the glass sheet 105 at the bottom of the pull roll assembly 140 this means that the pulling rolls 145 and 150 need to make up for this force in order to maintain the required sheet pulling force. The present invention helps one to control the pulling rolls 145 and 150 so that they can maintain the required sheet pulling force on the glass sheet 105. Several different embodiments of the pull roll assembly 140 are described in detail below with respect to FIGS. 2-7.

Figure 2:
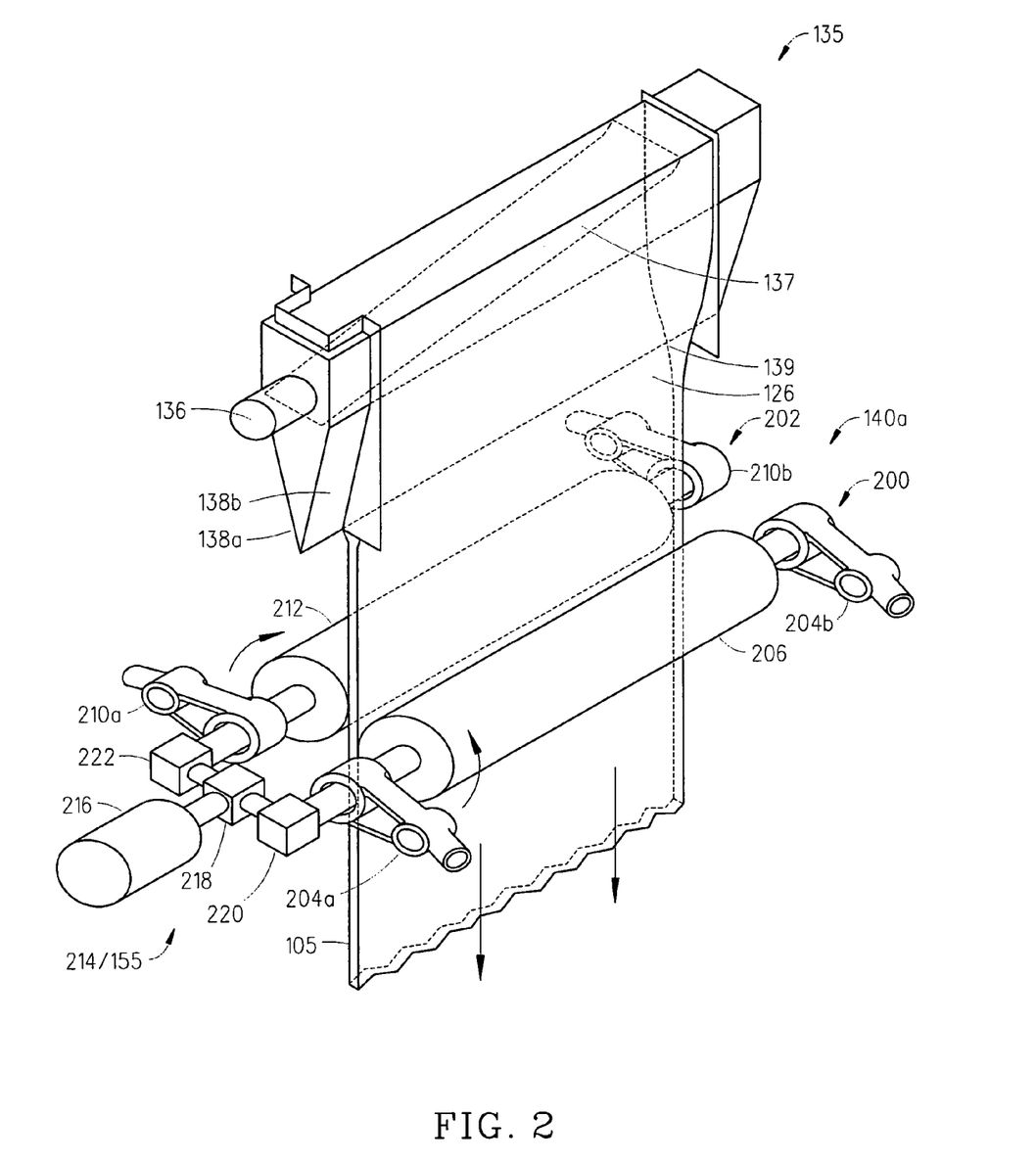
FIG. 2 is a perspective view of a first embodiment of the pull roll assembly shown in FIG. 1.

Referring to FIG. 2, there is a perspective view of a first embodiment of the pull roll assembly 140a in accordance with the present invention. The pull roll assembly 140a includes a first roll assembly 200 and a second roll assembly 202. The first roll assembly 200 includes two pulling roll support arms 204a and 204b that support a first roll 206. Likewise, the second roll assembly 202 includes two pulling roll support arms 210a and 210b that support a second roll 212. The pull roll assembly 140a also incorporates a differential drive 214 (e.g., device 155) which includes a motor 216 (e.g., 1hp motor 216) coupled to drive a differential axle 218 which in turn drives two 90° degree gear boxes 220 and 222. The first 90° degree gear box 220 interfaces with and drives the first roll 206. And, the second 90° degree gear box 222 interfaces with and drives the second roll 212. In the preferred embodiment, the speed of the differential axle 218 and the two 90° degree gear boxes 220 and 222 can be in the low speed range of 5-100 rpm which reduces the mechanical wear of these devices as compared to automotive applications.

In operation, the differential drive 214 rather than delivering constant rpm speed to the rolls 206 and 212 operates to deliver equal and constant torque to the rolls 206 and 212 with respect to the required sheet pulling force while allowing the rotational speeds of each of the rolls 206 and 212 to change with respect to one another based on the small but unavoidable difference between the radii of roll 206 and roll 212. In particular, the differential drive 214 delivers equal torque to both rolls 206 and 212 and allows the angular velocity of each roll 206 and 212 to change so that the surface speed of the glass sheet 105 on the rolls 206 and 212 matches the speed of the rolls 206 and 212 regardless of the differences in the diameters of the rolls 206 and 212. Thus, the differential drive 214 is a marked improvement over the state of the art in that any variations in diameters between rolls 206 and 212 are compensated for by allowing changes in the angular speeds of the rolls 206 and 212. In this way, the differential drive 214 ensures that there is little or no slipping or scuffing of the rolls 206 and 212 on the surface of the glass sheet 105. Advantages associated with using the differential drive 214 include: (1) minimizing damage to the glass sheet 105; (2) improving the life of the rolls 206 and 212; (3) improving draw stability; and (4) decreasing variation in the thickness of the glass sheet 105 for a given difference in roll radius between rolls 206 and 212.

Figure 3:
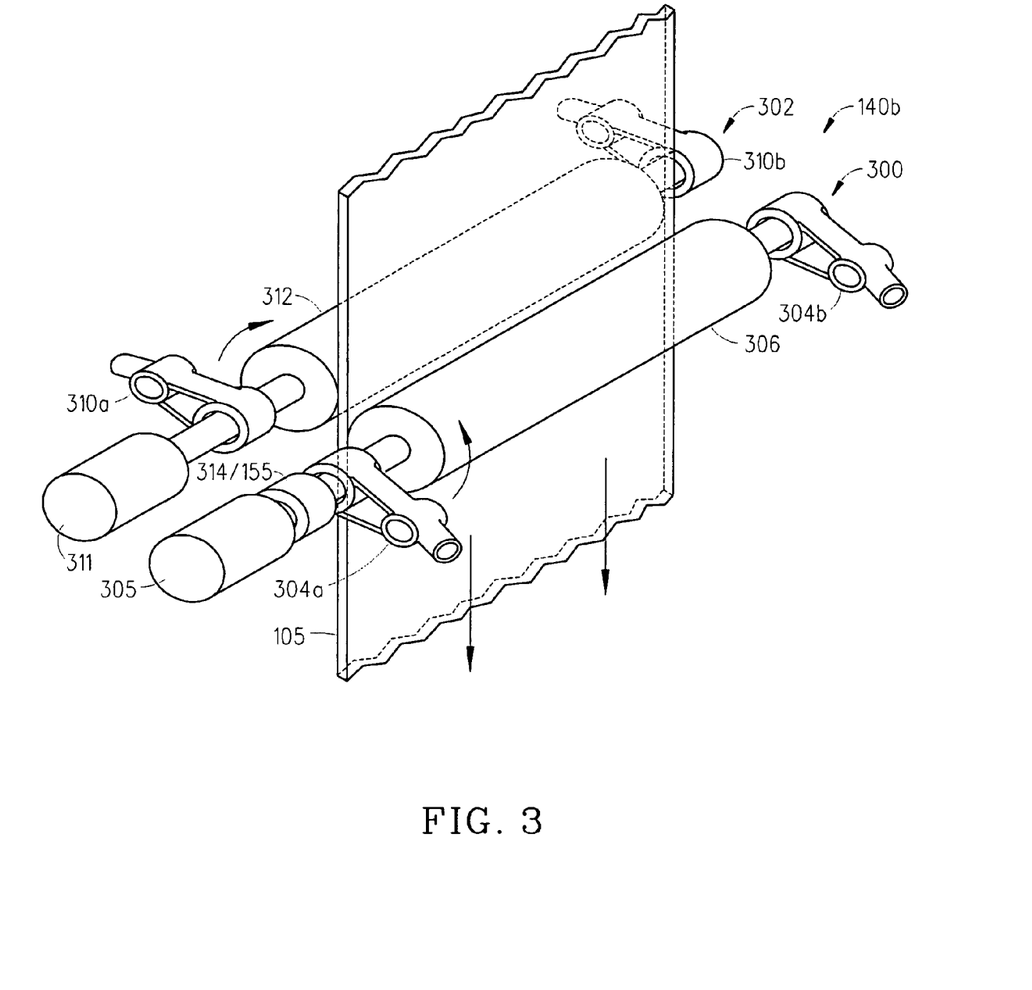
FIG. 3 is a perspective view of a second embodiment of the pull roll assembly shown in FIG. 1.

Referring to FIG. 3, there is a perspective view of a second embodiment of the pull roll assembly 140b in accordance with the present invention. The pull roll assembly 140b includes a first roll assembly 300 and a second roll assembly 302. The first roll assembly 300 includes two pulling roll support arms 304a and 304b that support a first roll 306 which is driven by a first constant rotational drive/motor 305. Likewise, the second roll assembly 308 includes two pulling roll support arms 310a and 310b that support a second roll 312 which is driven by a second constant torque drive/motor 311. The pull roll assembly 140b also includes a sensor 314 e.g., device 155) which in this embodiment is a torque transducer 314 that is associated with the first roll assembly 300.

In operation, the first drive/motor 305 turns the first roll 306 at constant angular velocity such that the flow of the glass sheet 105 from the forming vessel 135 (see FIG. 1) is held constant and therefore the thickness of the glass sheet 105 is determined by the speed of the first roll 306. Depending on the composition and temperature of the glass sheet 105, the required sheet pulling force F necessary to stretch the glass sheet 105 from the thickness leaving the forming vessel 135 to its final thickness is constant as long as the surface velocity of the first roll 306 remains constant. If the second roll 312 is not being driven by the second drive/motor 311 but is idling in contact with the glass sheet 105, the torque being delivered to the glass sheet 105 is F times the radius of the first roll 306 where F is the required pulling force. The torque transducer 314 measures this torque. If the torque delivered by the second drive/motor 311 to the second roll 312 is now set at one half the torque of the first roll 306 when it was supplying all the required sheet pulling force (not counting the force provided by the weight of the glass sheet 105), then the second roll 312 will be supplying one half of the pulling force and the first roll 306 the other half. In other words the two rolls 306 and 312 will be sharing the load. This is preferred over one roll 306 or 312 doing all the work because the shear force between the rolls 306 and 312 and the glass sheet 105 is a minimum for both rolls 306 and 312 which permits lower normal forces and prevents slippage and therefore is less likely to produce checks in the glass sheet 105 that may cause the breakage of the glass sheet 105. One advantage associated with using the pull roll assembly 140b includes eliminating/reducing the problematic scuffing of the glass sheet 105.

Figure 4:
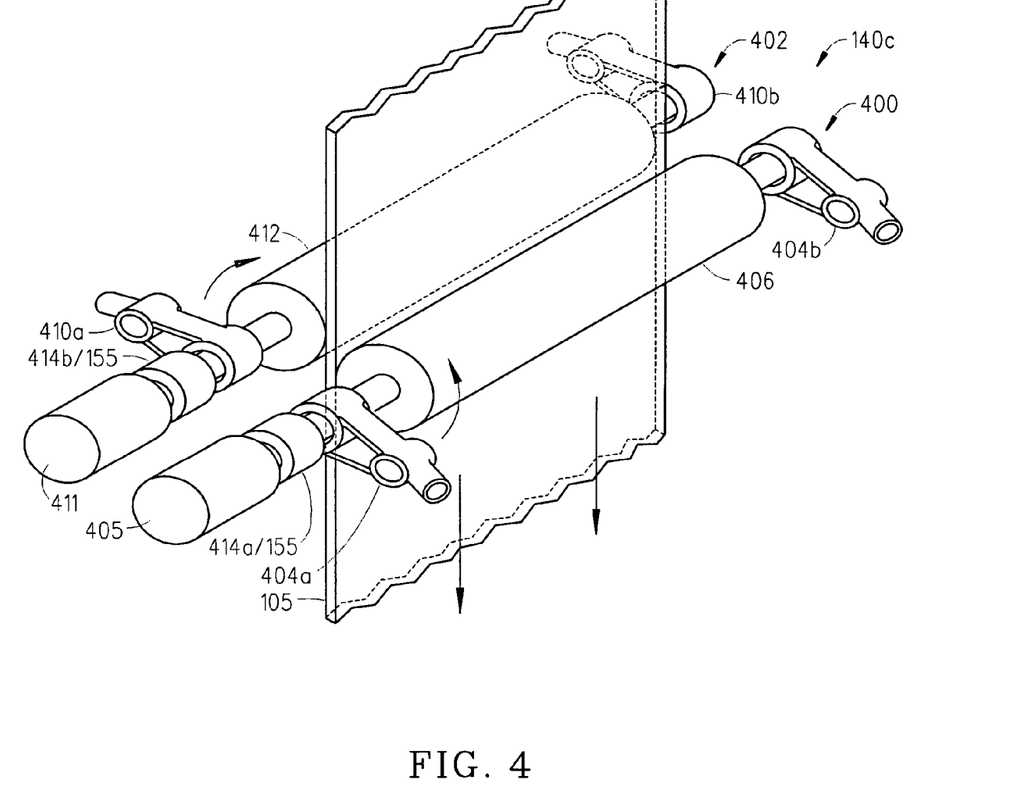
FIG. 4 is a perspective view of a third embodiment of the pull roll assembly shown in FIG. 1.

Referring to FIG. 4, there is a perspective view of a third embodiment of the pull roll assembly 140c in accordance with the present invention. The pull roll assembly 140c includes a first roll assembly 400 and a second roll assembly 402. The first roll assembly 400 includes two pulling roll support arms 404a and 404b that support a first roll 406 which is driven by a first drive/motor 405. Likewise, the second roll assembly 402 includes two pulling roll support arms 410a and 410b that support a second roll 412 which is driven by a second drive/motor 411. The pull roll assembly 140c also includes two sensors 414a and 414b (e.g., device 155) which in this embodiment are torque transducers 414a and 414b that are associated with the first roll assembly 400 and the second roll assembly 402, respectively. In operation, the first and second drives/motors 405 and 411 operate at the same torque and share the load of drawing the glass sheet 105 between rolls 406 and 412. In particular, the drives of motors 405 and 411 receive electrical signals indicative of the torque measured by torque sensors 414a and 414b and controls the motors 405 and 411 such that the motors 405 and 411 share the load drawing the glass sheet 105 between rolls 406 and 412. It should be appreciated that this embodiment also requires the drives to control the angular speeds of the rolls 406 and 412 to insure a steady velocity of the glass sheet 105. Otherwise, the thickness of the glass sheet 105 can vary with temperature variations and sheet cut-off weight variations.

Figure 5:
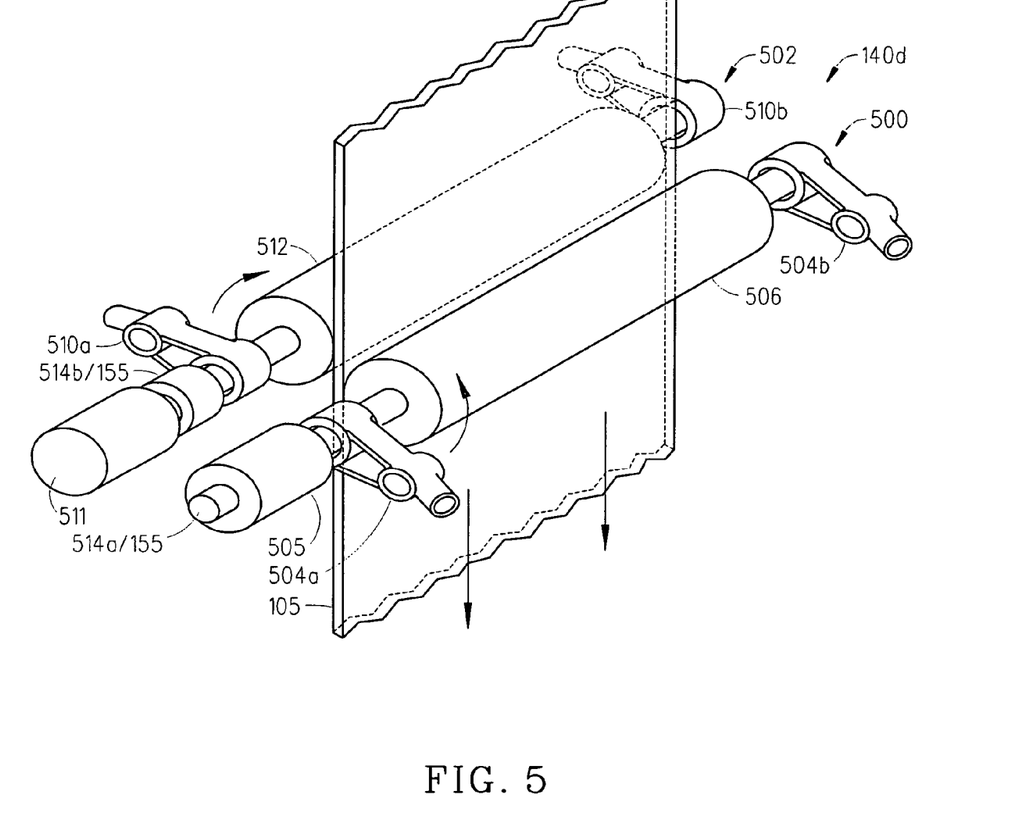
FIG. 5 is a perspective view of a fourth embodiment of the pull roll assembly shown in FIG. 1.

Referring to FIG. 5, there is a perspective view of a fourth embodiment of the pull roll assembly 140d in accordance with the present invention. The pull roll assembly 140d includes a first roll assembly 500 and a second roll assembly 502. The first roll assembly 500 includes two pulling roll support arms 504a and 504b that support a first roll 506 which is driven by a first drive/motor 505. Likewise, the second roll assembly 508 includes two pulling roll support arms 510a and 510b that support a second roll 512 which is driven by a second drive/motor 511. The pull roll assembly 140d also includes sensors 514a and 514b (e.g., device 155) in the form of software which in this embodiment is a speed sensor 514a and a torque transducer 514b that are associated with the first drive/motor 505 and the second drive/motor 511, respectively. In operation, the first drive/motor 505 operates at a constant angular velocity and the second drive/motor 511 operates at a constant torque equal to that being delivered by the first drive/motor 505. Thus, the first drive/motor 505 alone determines the drawing speed of the glass sheet 105 and the second drive/motor 511 helps to supply part of the required sheet pulling force by delivering a constant torque to the second roll 512.

Figure 6:
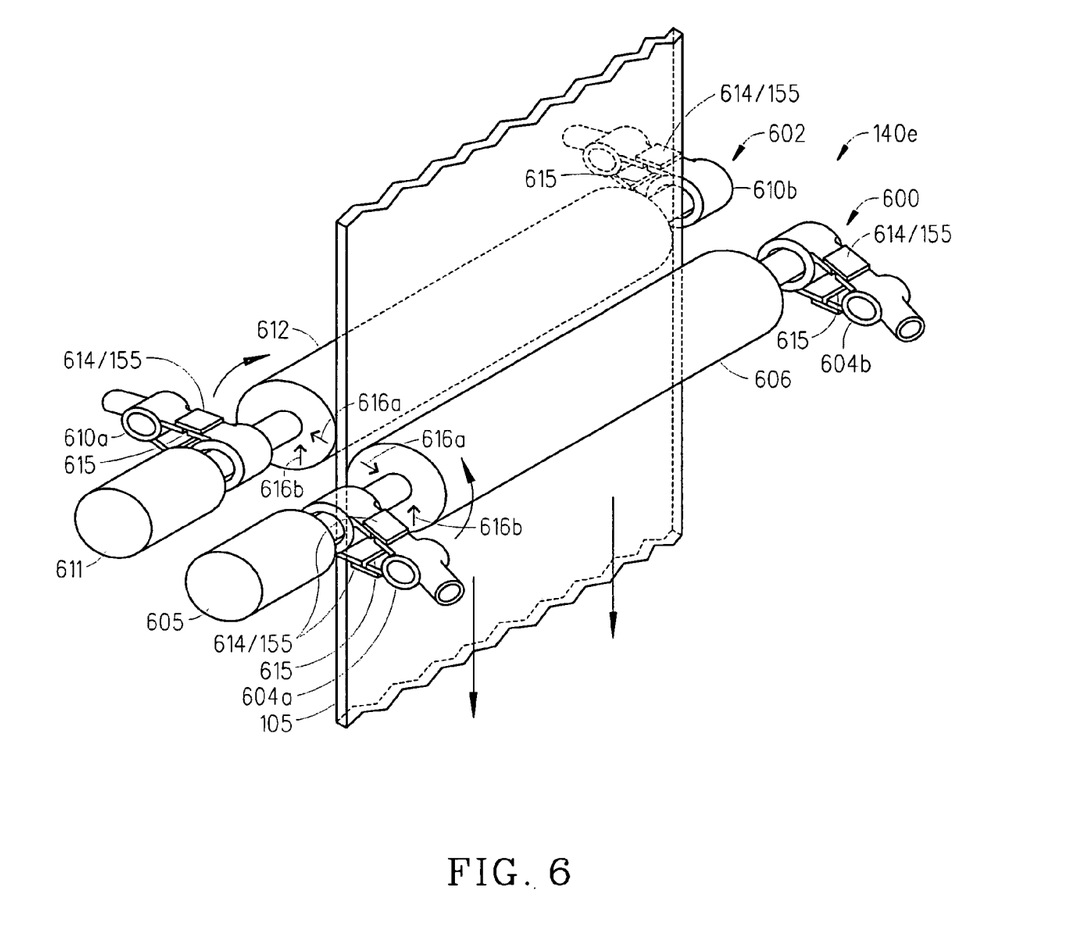
FIG. 6 is a perspective view of a fifth embodiment of the pull roll assembly shown in FIG. 1.

Referring to FIG. 6, there is a perspective view of a fifth embodiment of the pull roll assembly 140e in accordance with the present invention. The pull roll assembly 140e includes a first roll assembly 600 and a second roll assembly 602. The first roll assembly 600 includes two pulling roll support arms 604a and 604b that support a first roll 606 which is driven by a first drive/motor 605. Likewise, the second roll assembly 608 includes two pulling roll support arms 610a and 610b that support a second roll 612 which is driven by a second drive/motor 611. The pull roll assembly 140e also includes one or more sensors 614 (e.g., device 155) which in this embodiment are electrical strain gage modules 614. As shown, four electrical strain modules 614 extend across gaps 615 within the four pulling roll support arms 604a, 604b and 610a and 610b. It should be appreciated that not all but any number of the pulling roll support arms 604a, 604b, 610a and 610b can incorporate an electrical strain module 614. Moreover, it should be appreciated that the sensor 614 need not be an electrical strain gage module 614 but can be anyone of a variety of sensors that measures pressure, displacement, deflection or torque (for example).

Figure 7A:
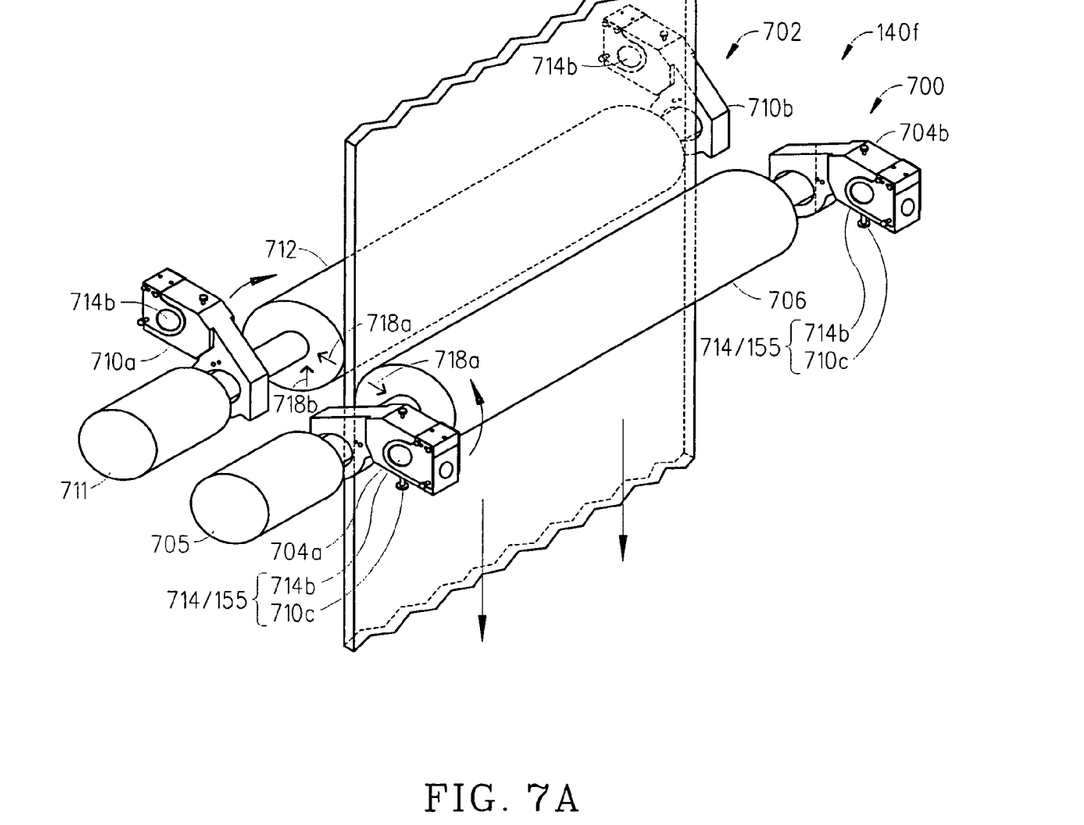
FIGS. 7A-7C are different views of a sixth embodiment of the pull roll assembly shown in FIG. 1.
Figure 7B:
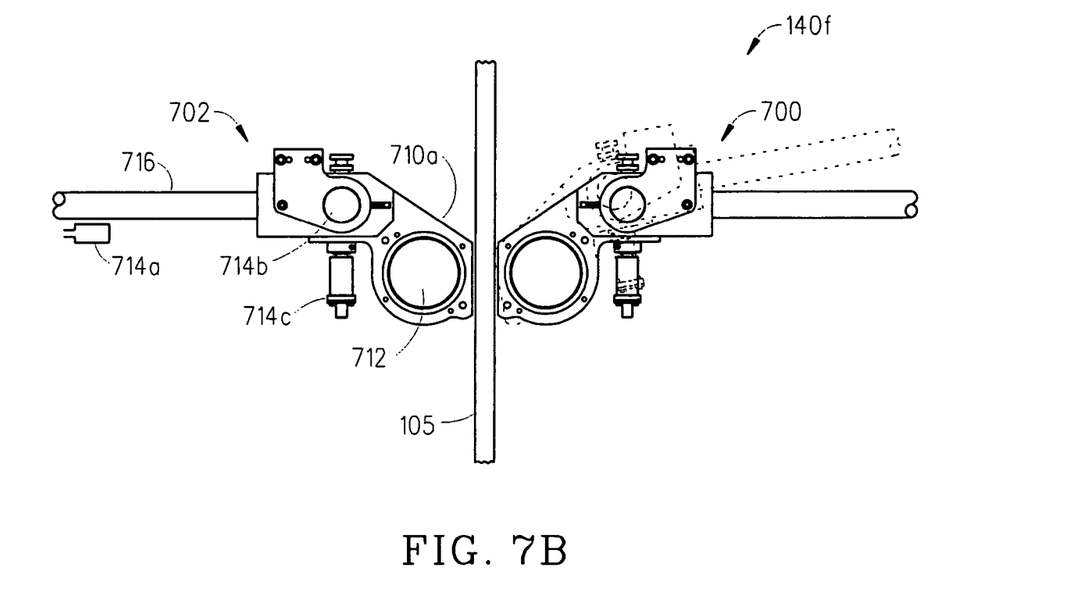

The pulling roll support arms 604a, 604b, 610a and 610b that incorporate electrical strain modules 614 in effect are converted into "load cells". In particular, the pulling roll support arms 604a, 604b, 610a and 610b and electrical strain modules 614 enables pulling forces 616a and 616b (e.g., glass contact normal force 616a and required sheet pulling force 616b) exerted by the rolls 606 and 612 on the drawn glass sheet 105 to be precisely determined. The forces 616a and 616b measured by each electrical strain module 614 are converted into an electrical signal (e.g., 0-5 Vdc, 4-20 mA) that is sent to a computer (not shown) or the corresponding drive/motor 605 and 611. Upon receiving the electrical signal, the corresponding drive precisely controls the rotational speed of the motors 605 and 611 coupled to rolls 606 and 612 which enables one to maintain the required pulling force on the drawn glass sheet 105 even when the force supplied by the weight of the glass sheet 105 constantly changes. It should be appreciated that the electrical signals can be used in a wide variety of control schemes other than the one described above to help draw the glass sheet 105. Several different exemplary control schemes and uses of the electrical signals are described below:

Knowing the normal forces 616a and 616b could permit closed loop or open loop adjustment to the position of the arm weights (see arm weights 716 in FIG. 7B). This would lessen the formation of checks in the glass sheet 105 and reduce down time and equipment damage.

Knowing the pulling forces 616a and 616b exerted by the rolls 606 and 612 on the glass sheet 105 enables one to tract how these forces 616a and 616b change with time which can if necessary enable an early warning system to tell an operator that some critical process variables are changing and that he/she may need to take corrective action. The main process variables that could be adjusted include the temperatures in a lower muffle and in a flow control glass delivery tube 130 (see FIG. 1).

Traditionally it was virtually impossible to measure the average viscosity of the glass sheet 105 as it was being stretched. The present invention solves this problem since the pulling forces 616a and 616b are inversely related to the average viscosity of the glass sheet 105. As such, the electrical signals associated with the pulling forces 616a and 616b can enable the closed loop control of a variety of critical variables (e.g., temperature in the delivery tube 130 shown in FIG. 1) in the manufacturing process of the glass sheet 105.

Because the rolls 606 and 612 generally pull on the edges of the glass sheet 105, the forces measured by the transducers 155 and the load cells (see load cell 714a in FIG. 7B) could be balanced thru thermal control. This could be very beneficial to the draw operation and could be implemented using a closed loop control process.

The electrical signals could also give immediate notice to the operators as to the condition of the glass sheet 105 at the bottom of the draw with regard to breakouts. This immediate notice would enable the operator to take prompt action which would help improve downtime and reduce the damage to draw equipment.

The electrical signals could also be used to divide the pulling load equally between the rolls 606 and 612 thereby reducing roll wear and sheet movement that causes stress in the glass sheet 105.

Figure 7C:
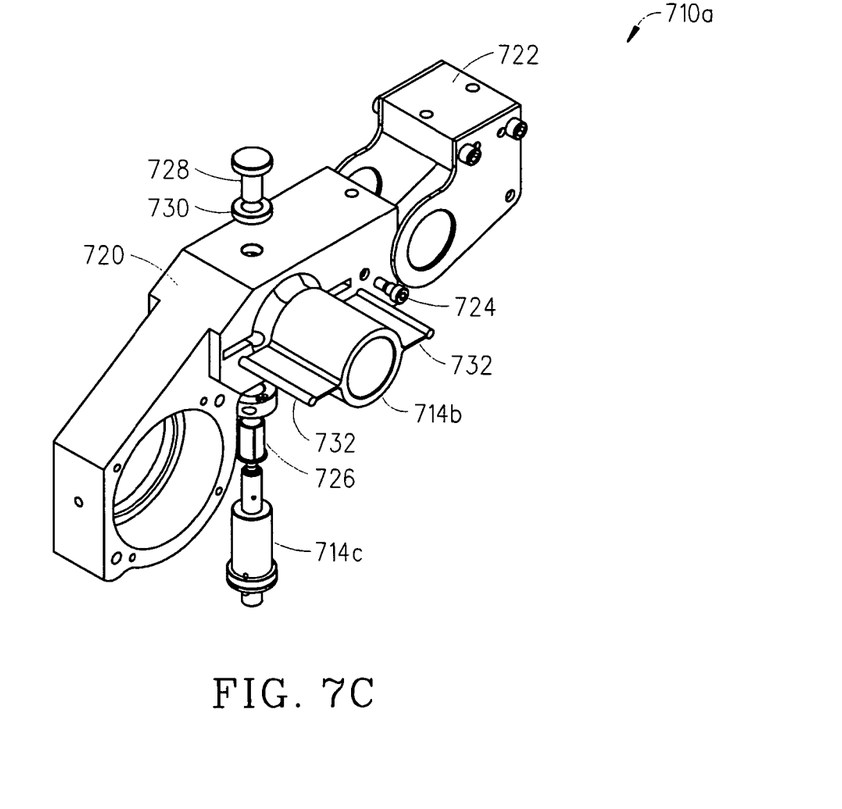

Referring to FIGS. 7A-7C, there are illustrated several views of a sixth embodiment of the pull roll assembly 140f in accordance with the present invention. The pull roll assembly 140f includes a first roll assembly 700 and a second roll assembly 702. The first roll assembly 700 includes two pulling roll support arms 704a and 704b that support a first roll 706 which is driven by a first drive/motor 705. Likewise, the second roll assembly 708 includes two pulling roll support arms 710a and 710b that support a second roll 712 which is driven by a second drive/motor 711. The pull roll assembly 140f also includes multiple sensors 714 (e.g., device 155) which in this embodiment are load cells 714a (see FIG. 7B) and combined springs 714b and linear variable differential transformers (LVDTS) 714c.

As shown in FIG. 7B, there is illustrated an end view of the pull roll assembly 140f which includes a "fixed" second roll assembly 702 where each pulling roll support arm 710a (shown) has a load cell 714a located at the end of an arm 716 which senses the horizontal loading at that point. And, each pulling roll support arm 710a (shown) has a pivot point where the spring 714b is located so that it can interact with the LVDT 714c. The LVDT 714c senses a gap between the pulling roll support arm 710a (shown) and the spring 714b. The gap is directly related to the vertical load on the roll 712 caused by the glass sheet 105. The pull roll assembly 140f also includes a "floating" first roll assembly 700 where each pulling roll support arm 704a (shown) has a pivot point where the spring 714b is located so that it can interact with the LVDT 714c. The LVDT 714c senses a gap between the pulling roll support arm 710a (shown) and the spring 714b. As such, the pull roll assembly 140f shown includes two load cells 714a, four springs 714b and four LVDTs 714c. However, it should be appreciated that the pull roll assembly 140f could include any number of load cells 714a, springs 714b and LVDTs 714c. In the preferred embodiment, the load cells 714a can be rated upto 250 lbs. and be manufactured by Honeywell Sensotec.

As shown in FIG. 7C, there is illustrated an exploded perspective view of one of the pulling roll support arms 704a, 704b, 710a and 710b. The pulling roll support arm 710a (shown) includes a frame 720 supported by a horizontal restraint 722. The horizontal restraint 722 is designed to transmit horizontal structural loads on the frame 720 directly to the arm 716 (see FIG. 7B) without effecting the vertical loads on the spring 714b. The horizontal restraint 722 is attached to the frame 720 with shoulder bolts 724 (only one shown) that provides a bearing surface for the horizontal restraint 722 to slightly rotate when the spring 714b is loaded. The LVDT 714c interfaces with a bushing 726 (e.g., Torlon bushing 726) and is inserted in the frame 720 so it is positioned next to the spring 714b. Lastly, a load limiting screw 728 and a jamb nut 730 are inserted into the frame 720. In the preferred embodiment, the spring 714b is made from hardened 17-7 stainless steel and can be designed to deflect approximately 100 microinches/1b of force. In particular, the spring 714b is a separate structural element in order to maximize sensitivity to vertical loads and to minimize sensitivity to other loads. And, the ends 732 of the spring 714b can be coated with a diamond like coating to decrease hysterisis due to friction. The spring 714b is calibrated with the LVDT 714c which is also relatively immune to the hostile electromagnetic and thermal conditions associated with the fusion process. The LVDT 714c can be manufactured by Schaevitz, Inc.

In operation, the pulling roll support arms 704a, 704b, 710a and 710b and in particular the load cells 714a and the combined springs 714b and LVDTs 714c enables the pulling forces 718a and 718b (e.g., glass contact normal force 718a and required sheet pulling force 718b) exerted by the rolls 706 and 712 on the drawn glass sheet 105 to be precisely determined. In particular, the measured forces 718a and 718b are converted into electrical signals (e.g., 0-5 Vdc, 4-20 mA) that are sent to a computer (not shown) or the corresponding drive/motor 705 and 711. Upon receiving the electrical signals, the corresponding drive precisely controls the rotational speed of the motors 705 and 711 coupled to rolls 706 and 712 which enables one to maintain the required sheet pulling force 718b on the drawn glass sheet 105 even when the force supplied by the weight of the glass sheet 105 constantly changes. Again it should be appreciated that the electrical signals can be used in a wide variety of control schemes other than the one described above to help draw the glass sheet 105. Several different exemplary control schemes and uses of the electrical signals that could be used in this embodiment have already been described above with respect to FIG. 6.

Figure 8:
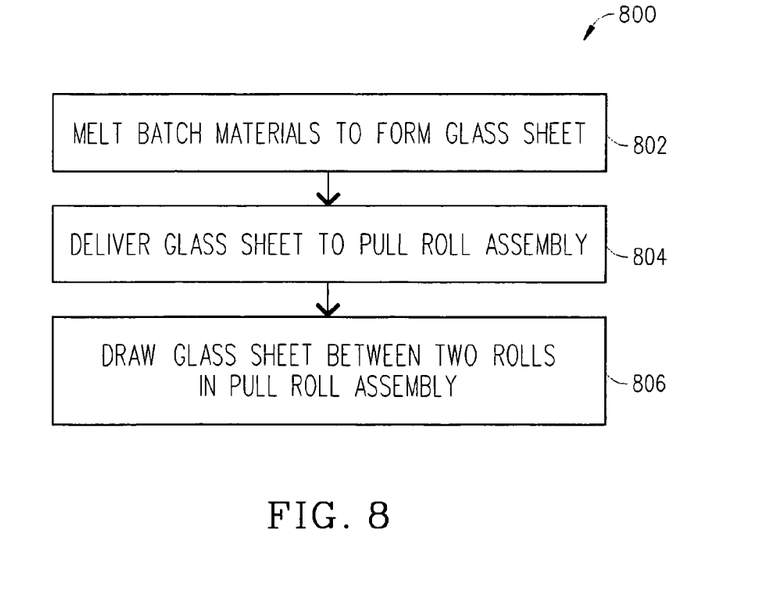
FIG. 8 is a flowchart illustrating the basic steps of a preferred method for producing a glass sheet in accordance with the present invention.

Referring to FIG. 8, there is a flowchart illustrating the basic steps of a preferred method 800 for producing a glass sheet 105 in accordance with the present invention. For clarity, the method 800 is described below with respect to using the pull roll assembly 140e (see FIG. 6). However, it should be understood that the method 800 can be performed using any of the other pull roll assemblies 140a, 140b, 140c, 104d and 104f (see FIGS. 2-5 and 7). Beginning at steps 802 and 804, the glass manufacturing system 100 is used to melt batch materials to form the glass sheet 105 which is then delivered to the pull roll assembly 140e (see FIG. 6). At step 806, the glass sheet 105 is then drawn between two rolls 606 and 612 of the pull roll assembly 104e (see FIG. 6). Basically, the pull roll assembly 104e includes a first roll assembly 600, a second roll assembly 602 and one or more sensors 614 (e.g., electrical strain gage modules 614). The sensors 614 enable one to control the first and/or second roll assemblies 600 and 602 while the glass sheet 105 is being drawn between the first and second roll assemblies 600 and 602, wherein the control of the first and second roll assemblies 600 and 602 is based in part on pulling forces 616a and/or 616b associated with the glass sheet 105 that are measured while the glass sheet 105 is drawn between the first and second roll assemblies 600 and 602. As described above, the required sheet pulling force 616b includes the force supplied to the glass sheet 105 by rolls 600 and 602 and the force associated with the weight of the glass sheet 105. And, since the weight of the glass sheet 105 is constantly changing because of the cutting and removal of the glass sheet 105 at the bottom of the pull roll assembly 140e this means that the pulling rolls 600 and 602 need to make up for this force in order to maintain the required sheet pulling force 616b. The present invention helps one to control of the pulling rolls 600 and 602 so that they can maintain the required sheet pulling force 616b on the glass sheet 105.

It should be appreciated that for clarity a universal joint is not shown in FIGS. 2-7 which is used to connect the motor to the roll assembly. In particular, the universal joint enables one to rotate the roll away from the glass sheet without having to disconnect the drive shaft to the motor thereby insuring that the roll is rotating at all times. This prevents permanent warping of the roll due to temperature gradients.

Following are some additional features and uses of the pull roll assembly 140 and method 800 of the present invention:

Some of the advantages associated with the present invention are as follows: (1) prevents glass sheet breakouts caused by checks in the glass sheet; (2) improves the flatness of the glass sheet; (3) diminishes movement of the glass sheet which reduces glass sheet stress; and (4) reduces variation in the thickness of the glass sheet by controlling the pull on the glass sheet; and (5) increases the roll life.

The glass sheet 105 can be a Liquid Crystal Display (LCD) glass plate that was made in accordance with a fusion process described in U.S. Pat. Nos. 3,338,696 and 3,682,609 both of which are incorporated by reference herein. These LCD glass sheets 105 are known in the industry as Corning Incorporated Codes 7059 and 1737 sheet glass or EAGLE 2000™ sheet glass.

It should be appreciated that the pull roll assembly 140 can be used in a glass manufacturing system 100 that has a different configuration and different components than the one shown in FIG. 1 and still be considered within the scope of the present invention.

Although six embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A glass manufacturing system comprising:
   at least one vessel for melting batch materials and forming molten glass;
   an isopipe for receiving the molten glass and forming a glass sheet; and
   a fusion draw machine for receiving the glass sheet and drawing the glass sheet, wherein said fusion draw machine includes:
      a first roll assembly including:
         a first pulling roll support arm;
         a first motor; and
         a first roll;

said first pulling roll support arm includes a frame supported by a horizontal restraint that is configured to transmit a horizontal load on said frame directly to an arm that is attached to one end of the frame, where a load cell is attached to the arm to measure the horizontal load which is caused by the glass sheet interfacing with said first roll that is rotatably attached to said frame and said first roll is also driven by said first motor;

said frame further includes a pivot point where a spring is located and when a vertical load is present the first roll moves in a downward direction which changes a gap between said spring and a gap sensor, wherein the gap sensor measures a distance of the gap which is directly related to a distance the first roll moves in the downward direction and to the vertical load which is caused by the glass sheet interfacing with said first roll that is rotatably attached to said frame, and wherein the horizontal restraint is configured to transmit the horizontal load on the frame directly to the arm without effecting the vertical load on the spring;

a second roll assembly including:
a second pulling roll support arm,
a second motor; and
a second roll.

2. A pull roll assembly comprising:
a first roll assembly including:
a first pulling roll support arm;
a first motor; and
a first roll;
said first pulling roll support arm includes a frame supported by a horizontal restraint that is configured to transmit a horizontal load on said frame directly to an arm that is attached to one end of the frame, where a load cell is attached to the arm to measure the horizontal load which is caused by a glass sheet interfacing with said first roll that is rotatably attached to said frame and said first roll is also driven by said first motor;

said frame further includes a pivot point where a spring is located and when a vertical load is present the first roll moves in a downward direction which changes a gap between said spring and a gap sensor, wherein the gap sensor measures a distance of the gap which is directly related to a distance the first roll moves in the downward direction and to the vertical load which is caused by the glass sheet interfacing with said first roll that is rotatably attached to said frame, and wherein the horizontal restraint is configured to transmit the horizontal load on the frame directly to the arm without effecting the vertical load on the spring; and a second roll assembly including:
a second pulling roll support arm;
a second motor, and
a second roll; and said load cell and said gap sensor enables one to control at least the first motor while the glass sheet is being drawn between the first and second rollers, wherein the control of at least the first motor is based in part to substantially maintain a required sheet pulling force associated with the glass sheet while the glass sheet is being drawn between the first and second rollers, wherein the required sheet pulling force includes a force supplied to the glass sheet and a force associated with a weight of the glass sheet where the weight changes because a part of the drawn glass sheet is cut and removed therefrom, wherein said load cell and said gap sensor by enabling the control of at least the first motor to substantially maintain the required sheet pulling force helps prevent either or both of the first and second rolls from slipping on one or more surfaces of the glass sheet.

3. The pull roll assembly of claim 2, wherein said gap sensor is a linear variable differential transformer.

4. A method for producing a glass sheet, said method comprising the steps of:
melting batch materials to form the glass sheet;
delivering the glass sheet to a fusion draw machine; and
drawing the glass sheet using the fusion draw machine which comprises:
a first roll assembly including:
at least one pulling roll support arm;
a first constant rotational drive motor;
a first roll: and
a first torque sensor;
a second roll assembly including:
at least one pulling roll support arm;
a second constant torque motor; and
a second roll; and
using the first torque sensor to measure torque being delivered to the glass sheet as the glass sheet is drawn between the first and second rolls while the first constant rotational drive motor is driving the first roll and the second constant torque motor is not driving the second roll; and
using the measured torque to determine how much torque is to be subsequently applied by the second constant torque motor to the second roll such that both the first roll and the second roll share a load in drawing the glass sheet.

5. A method for producing a glass sheet, said method comprising the steps of:
melting batch materials to form the glass sheet;
delivering the glass sheet to a fusion draw machine; and
drawing the glass sheet using the fusion draw machine which comprises:
a first roll assembly including:
a first pulling roll support arm;
a first motor; and
a first roll;
said first pulling roll support arm includes a frame supported by a horizontal restraint that is configured to transmit a horizontal load on said frame directly to an arm that is attached to one end of the frame, where a load cell is attached to the arm to measure the horizontal load which is caused by the glass sheet interfacing with said first roll that is rotatably attached to said frame and said first roll is also driven by said first motor;

said frame further includes a pivot point where a spring is located and when a vertical load is present the first roll moves in a downward direction which changes a gap between said spring and a gap sensor, wherein the gap sensor measures a distance of the gap which is directly related to a distance the first roll moves in the downward direction and to the vertical load which is caused by the glass sheet interfacing with said first roll that is rotatably attached to said frame, and wherein the horizontal restraint is configured to transmit the horizontal load on the frame directly to the arm without effecting the vertical load on the spring; and a second roll assembly including:
  a second pulling roll support arm;
  a second motor; and
  a second roll; and
using the measured horizontal load form the load cell and the measured gap from the gap sensor to control at least the first motor while the glass sheet is being drawn between the first and second rollers, wherein the control of at least the first motor is based in part to substantially maintain a required sheet pulling force associated with the glass sheet while the glass sheet is being drawn between the first and second rollers, wherein the required sheet pulling force which is related to the vertical force includes a force supplied to the glass sheet and a force associated with a weight of the glass sheet where the weight changes because a part of the drawn glass sheet is cut and removed therefrom, and wherein said load cell and said gap sensor by enabling the control of at least the first motor to substantially maintain the required sheet pulling force helps prevent either or both of the first and second rolls from slipping on one or more surfaces of the glass sheet.

* * * * *